(12) United States Patent
Shell et al.

(10) Patent No.: US 11,577,970 B2
(45) Date of Patent: Feb. 14, 2023

(54) WATER TREATMENT SYSTEMS AND METHODS FOR POULTRY CHILLERS

(71) Applicant: Morris & Associates, Inc., Garner, NC (US)

(72) Inventors: John P. Shell, Raleigh, NC (US); William F. Morris, III, Raleigh, NC (US)

(73) Assignee: Morris & Associates, Inc., Garner, NC (US)

(*) Notice: Subject to any disclaimer, the term of this patent is extended or adjusted under 35 U.S.C. 154(b) by 604 days.

(21) Appl. No.: 16/070,644

(22) PCT Filed: Jan. 19, 2017

(86) PCT No.: PCT/US2017/014137
§ 371 (c)(1),
(2) Date: Jul. 17, 2018

(87) PCT Pub. No.: WO2017/127546
PCT Pub. Date: Jul. 27, 2017

(65) Prior Publication Data
US 2020/0377383 A1  Dec. 3, 2020

Related U.S. Application Data

(60) Provisional application No. 62/281,789, filed on Jan. 22, 2016.

(51) Int. Cl.
| | | |
|---|---|---|
| *C02F 1/24* | (2006.01) | |
| *B03D 1/14* | (2006.01) | |
| *C02F 103/22* | (2006.01) | |

(52) U.S. Cl.
CPC ............ *C02F 1/24* (2013.01); *B03D 1/1431* (2013.01); *B03D 1/1462* (2013.01); *B03D 2203/001* (2013.01); *C02F 2103/22* (2013.01)

(58) Field of Classification Search
CPC .... C02F 1/24; C02F 1/465; C02F 1/52; C02F 2103/007; C02F 2103/22; C02F 1/40;
(Continued)

(56) References Cited

U.S. PATENT DOCUMENTS

| | | | | |
|---|---|---|---|---|
| 3,520,410 A | * | 7/1970 | Hutto, Jr. ............. | B01D 33/073 210/784 |
| 3,707,230 A | * | 12/1972 | Davidson ............... | B01D 33/04 210/785 |

(Continued)

FOREIGN PATENT DOCUMENTS

| | | |
|---|---|---|
| CN | 1765757 A | 5/2006 |
| CN | 103517746 A | 1/2014 |

(Continued)

OTHER PUBLICATIONS

English language machine translation of KR100630579, 6 Pages, No Date.*

(Continued)

*Primary Examiner* — Pranav N Patel
(74) *Attorney, Agent, or Firm* — Myers Bigel, P.A.

(57) ABSTRACT

A water treatment system for a poultry chiller including a chiller tank is described herein. The system includes a float holding tank at a downstream section of the chiller tank; a fan at the downstream section of the chiller tank that is configured to blow float formed on a surface of the water in the chiller tank into the float holding tank; and a float removal mechanism at the float holding tank that is configured to remove the float from the float holding tank. Related methods are also described.

7 Claims, 7 Drawing Sheets

(58) Field of Classification Search
CPC .... B03D 1/028; B03D 1/1431; B03D 1/1462; B03D 2203/001; B03D 1/16; B03D 1/00; B03D 1/02; B03D 1/1406; B03D 1/1475; B01D 33/06; B01D 2033/07; B01D 21/2433; B01D 21/2438; B01D 17/0205; B01D 21/04; B01D 21/0084; B01D 33/466; B01D 17/02; B01D 21/0012; B01D 21/003; B01D 21/2444

See application file for complete search history.

(56) References Cited

U.S. PATENT DOCUMENTS

| | | | | |
|---|---|---|---|---|
| 5,173,190 | A * | 12/1992 | Picek | B01D 17/085 210/651 |
| 5,540,836 | A * | 7/1996 | Coyne | C02F 3/006 210/221.2 |
| 6,129,626 | A | 10/2000 | Morris, Jr. et al. | |
| 6,722,490 | B1 | 4/2004 | Bass | |
| 2010/0213110 | A1 * | 8/2010 | Urquhart | B01D 21/2433 210/151 |
| 2011/0259803 | A1 | 10/2011 | Chao | |
| 2013/0319949 | A1 * | 12/2013 | Booth | B03D 1/1431 210/703 |
| 2015/0101988 | A1 | 4/2015 | Jensen et al. | |
| 2015/0291445 | A1 | 10/2015 | Peckham, Jr. | |

FOREIGN PATENT DOCUMENTS

| | | | |
|---|---|---|---|
| CN | 103894001 | A | 7/2014 |
| FR | 2240193 | | 3/1975 |
| JP | 2012239951 | A * | 12/2012 |
| KR | 20050093883 | A | 9/2005 |
| KR | 100630579 | | 10/2006 |
| KR | 100984579 | | 9/2010 |

OTHER PUBLICATIONS

English language machine translation of CN 103894001A, 2 pages, No Date.*
English language machine translation of JP2012239951A, 7 pages, No Date.*
International Search Report and Written Opinion of the International Search Authority for PCT/US2017/014137 dated Mar. 28, 2017; 13 pages.

* cited by examiner

WATER TREATMENT SYSTEMS AND METHODS FOR POULTRY CHILLERS

RELATED APPLICATIONS

This application is a 35 U.S.C. § 371 national phase application of PCT International Application No. PCT/US2017/014137, filed Jan. 19, 2017, which claims priority to U.S. Provisional Application No. 62/281,789, filed Jan. 22, 2016, the disclosure of each of which is incorporated by reference in its entirety.

BACKGROUND

It is desirable to treat water in poultry chillers to reduce the concentration of fats, oils and grease in order to improve the efficacy of anti-microbial treatment to the water and to increase the length of time such water is suitable for use in chilling poultry products.

SUMMARY

Some embodiments of the present invention are directed to a water treatment system for a poultry chiller including a chiller tank. The system includes a float holding tank at a downstream section of the chiller tank, a fan at the downstream section of the chiller tank that is configured to blow float formed on a surface of water in the chiller tank into the float holding tank, and a float removal mechanism at the float holding tank that is configured to remove the float from the float holding tank.

According to some embodiments, the fan is positioned on a first side of the chiller tank and the float holding tank is positioned on a second, opposite side of the chiller tank. The fan may be adjacent and/or coupled to an upper portion of a sidewall of the chiller tank.

According to some embodiments, the float removal mechanism includes a paddle and a drive mechanism configured to advance the paddle across the float holding tank. The float holding tank may include a ramp terminating in a lip at a side portion of the float holding tank, and the drive mechanism may be configured to advance the paddle up the ramp such that float collected by the paddle is discharged over the lip.

According to some embodiments, the float removal mechanism includes a rotary screen and a drive mechanism configured to rotate the rotary screen in the float holding tank. The float removal mechanism may include a wiper adjacent the rotary screen, and the drive mechanism may be configured to rotate the rotary screen such that float collected on an outer surface of the rotary screen is removed by the wiper.

According to some embodiments, the float removal mechanism includes a floating weir in the float holding tank and a drain chute in communication with the outside of the float holding tank, with the floating weir including an upper opening with a weir edge configured to allow float on a surface of the water to pass over the weir edge into the upper opening and a lower opening configured to allow float passing through the floating weir to exit through the drain chute. The floating weir may be further configured to float in the water of the float holding tank with the weir edge proximate the water level in the float holding tank. The lower opening of the floating weir may be configured to provide a sliding seal against the drain chute. The floating weir may include a plurality of spaced apart flotation segments with a gap defined between adjacent ones of the segments. The gaps may provide a flow path for float to flow therethough and into the upper opening of the floating weir.

According to some embodiments, the system includes: a saturation pump in fluid communication with the float holding tank and configured to remove effluent water from the float holding tank; a device configured to introduce air into the effluent water flowing from the floating holding tank to the saturation pump; and/or at least one injection nozzle at an upstream section of the chiller tank, the injection nozzle configured to inject the water received from the saturation pump into the tank to form micro-bubbles that rise to the surface of the water in the chiller tank and collect small pieces of debris so that a layer of float is formed on the surface of the water in the chiller tank.

According to some embodiments, the system is in combination with the chiller tank.

Some other embodiments of the present invention are directed to a method for treating water held in a poultry chiller including a chiller tank. The method includes: blowing float formed on a surface of the water in the chiller tank to one side of the chiller tank at a downstream portion thereof; receiving the float blown to one side of the chiller tank in a float holding tank; and removing the float from the float holding tank.

According to some embodiments, the blowing step is carried out using a fan that is adjacent a top portion of the chiller tank at a first side thereof, and the float holding tank is positioned at a second, opposite side of the chiller tank.

According to some embodiments, removing the float from the float holding tank includes advancing a paddle across the float holding tank to collect the float with the paddle and urge the float over a lip of the float holding tank.

According to some embodiments, removing the float from the float holding tank includes rotating a rotary screen in the float holding tank to collect the float on an outer surface of the rotary screen and removing the float from the outer surface of the rotary screen using a wiper that is adjacent the rotary screen.

According to some embodiments, removing the float from the float holding tank includes receiving the float at a floating weir in the float holding tank such that float flows over an edge of the floating weir and drains under the force of gravity out of the float holding tank.

According to some embodiments, the method includes: injecting water saturated with air using an injection nozzle at an upstream section of a chiller tank to form micro-bubbles that rise to the surface of water held in the chiller tank; collecting small pieces of debris with the micro-bubbles so that a layer of float is formed on the surface of the water in the chiller tank; and/or circulating water in the float holding tank back to the injection nozzle.

DETAILED DESCRIPTION OF EMBODIMENTS OF THE INVENTION

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "includes," "comprising," and/or "including," when used in this specification, specify the presence of stated features, integers, steps, operations, elements, and/or components, but do not preclude the presence or addition of one or more other features, integers, steps, operations, elements, components, and/or groups thereof.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
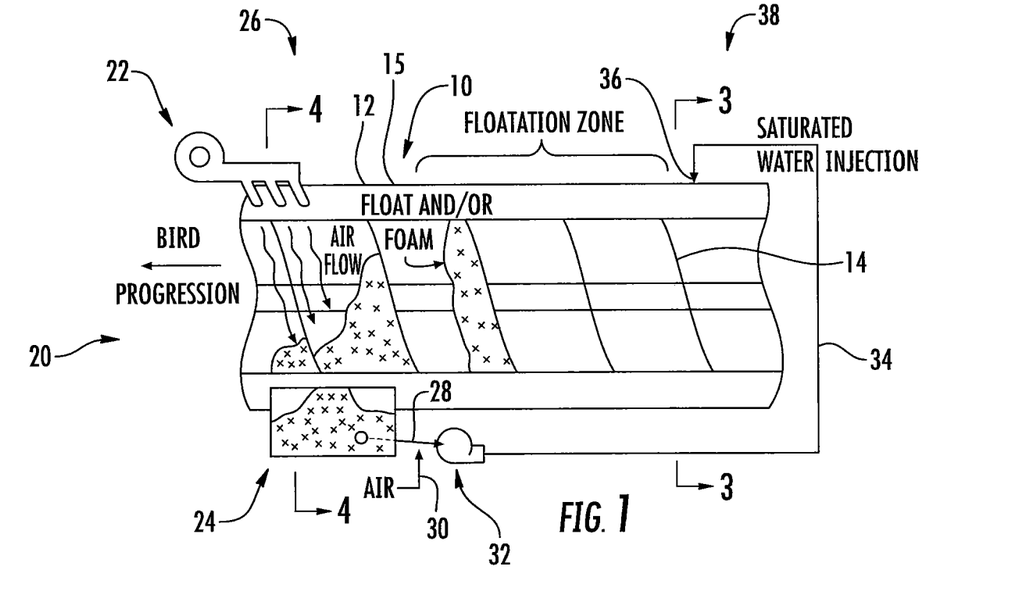
FIG. 1 is a top view of a poultry chiller and a water treatment system according to some embodiments.

FIG. 1 is a top view of a poultry chiller 10 according to some embodiments. The chiller 10 includes a chiller tank 12. According to some embodiments, the chiller 10 is an auger chiller and includes an auger 14 disposed in the tank 12. The operation of an auger chiller is well known to those of ordinary skill in the art and, therefore, a detailed description of such operation is omitted herein.

Figure 3:
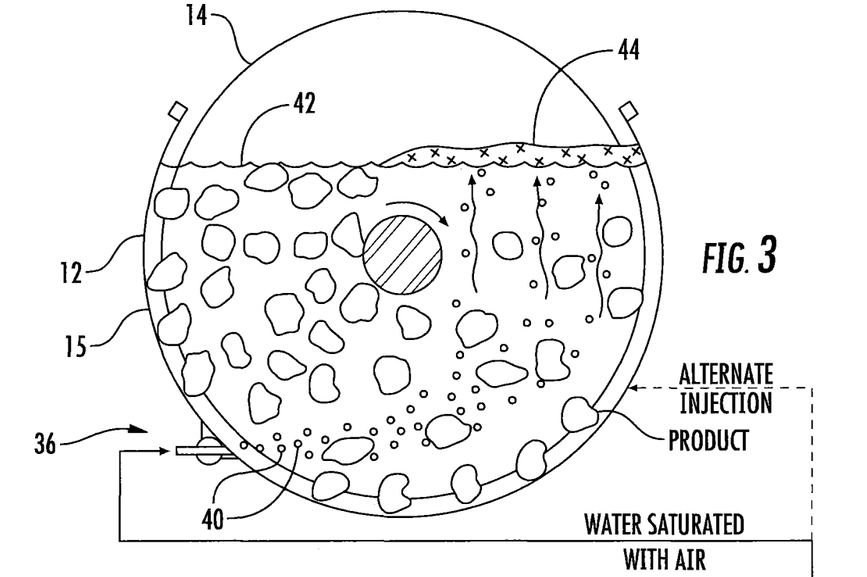
FIG. 3 is a sectional end view of an upstream section of the chiller and the water treatment system of FIG. 1 according to some embodiments.
Figure 4:
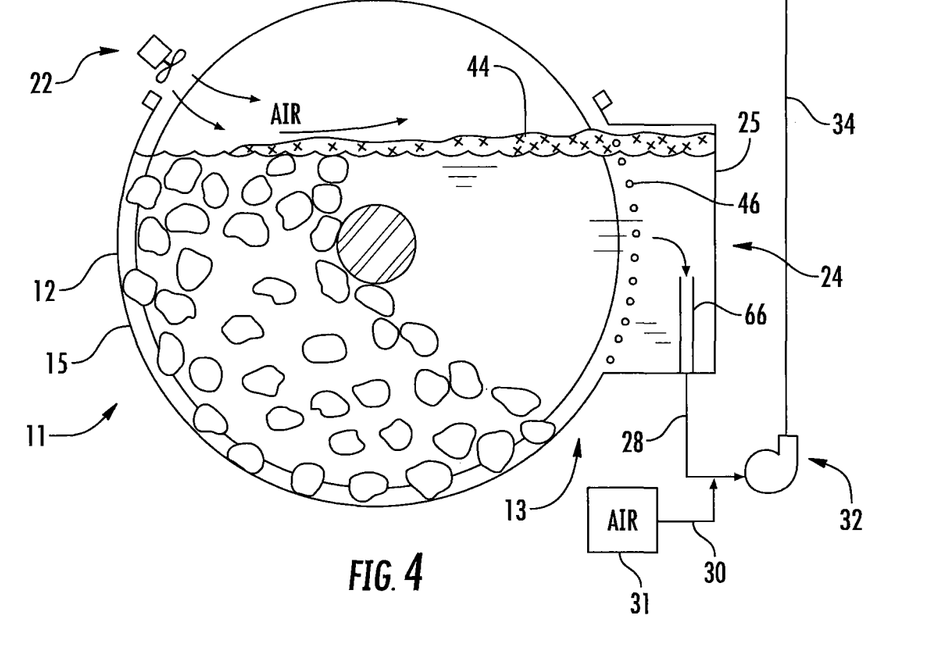
FIG. 4 is a sectional end view of a downstream section of the chiller and the water treatment system of FIG. 1 according to some embodiments.

A water treatment system 20 is associated with the chiller 10. Referring to FIGS. 1, 3 and 4, the water treatment system 20 includes a fan 22, a float collecting area or float holding tank such as a skimmer box 24, a saturation pump 32 and an injection nozzle 36. The float holding tank may include an appendage to the chiller tank in fluid communication with the chiller tank at the water surface or it may simply be a location within the chiller tank suitable for collecting float. The float holding tank is preferably outside the path of any moving component such as an auger or dasher.

The fan 22 and the skimmer box 24 are at a downstream section 26 of the chiller tank 12. The injection nozzle 36 is at an upstream section 38 of the chiller tank 12. As used herein, the terms "downstream" and "upstream" refer to the direction of poultry progression during operation of the chiller 10. According to some embodiments, the fan 22 and the skimmer box 24 are at a first end portion 26 of the chiller tank 12 and the injection nozzle 36 is at a second, opposite end portion 38 of the chiller tank 12.

The saturation pump 32 pulls effluent water 28 from the chiller 10 (e.g., from the skimmer box 24). Air is introduced into the water using any of various devices or means familiar to those of ordinary skill in the art such as a compressed air source 31 that may be included with the water treatment system 20 or a venturi that sucks ambient air into the flow of water. The saturation pump 32 mixes the air into the water and increases the water pressure so that some or all of the air dissolves into the water. According to some embodiments, compressed air is introduced downstream of the pump and allowed to dissolve into the water at that point. The saturation pump 32 delivers the saturated water 34 to the injection nozzle 36. As described above, the injection nozzle 36 is somewhat upstream of the skimmer box 24.

Referring to FIG. 3, the water from the injection nozzle 36 "fizzes" out and bubbles 40 (or micro-bubbles) rise to the water surface 42 in the chiller tank 12. As the bubbles rise to the surface, they adhere to small bits of debris along the way causing the debris to float. A layer of float 44 including foam as well as denser accretions of fats, grease and oil forms on the water surface and auger 14 (FIG. 1) pushes the float downstream.

This system is similar to a dissolved air floatation (DAF) process which removes suspended matter such as oil or solids. In prior art DAF applications, dirty water would be removed from the source for treatment in an independent aeration system and separation tank from which clean water returns. As described above, the removal is achieved by dissolving air in the water under pressure and then releasing the air at or near atmospheric pressure at the injection nozzle 36. The released air forms tiny bubbles which adhere to the suspended matter causing the suspended matter to float to the surface of the water. According to some embodiments, there may be a pressure reduction valve at or adjacent the injection nozzle to reduce the pressure of the water so that the dissolved air is released in the form of micro-bubbles.

The fan 22 then blows the float 44 over to the side of the chiller which may be the "dead side" of the chiller 10 (i.e., the side where the auger moves downwardly as it rotates). This is similar to the wind blowing across a pond and pushing scum to one side. The fan 22 may be positioned at or near a top of the chiller tank 12. In particular, the fan 22 is positioned such that it will blow air to move the float even if the water level in the chiller tank 12 varies. The fan 22 is positioned on a first side 11 of the chiller tank 12 and the skimmer box 24 is positioned on a second, opposite side 13 of the chiller tank 12.

The float is blown through bars 46 and into the skimmer box 24. The bottom of the skimmer box 24 may be positioned just below the minimum operating water level for the chiller. According to some embodiments, the skimmer box 24 is combined with a suction box. As understood by those of ordinary skill in the art, the suction box provides a space to remove water from the chiller so it can be pumped to a heat exchanger (e.g., re-chiller) and then to the opposite end of the chiller.

Figure 2:
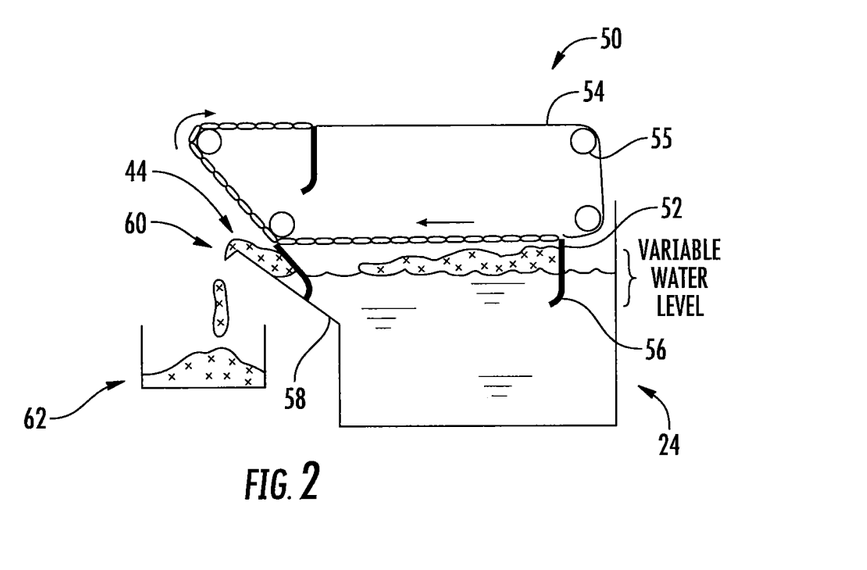
FIG. 2 illustrates a skimmer box of the water treatment system of FIG. 1 according to some embodiments.

A rake type skimmer or skimmer assembly 50 according to some embodiments is illustrated in FIG. 2. The skimmer 50 includes one or more skimmer paddles 52 that extend vertically down from a drive mechanism (as illustrated, the drive mechanism includes a chain 54 that is driven by sprockets 55). The paddle 52 may include a curved bottom edge or portion 56. The paddle 52 is pivotally attached or connected to the chain 54 such that the paddle is free to pivot about its attachment or connection point (the paddle typically hangs in a vertical orientation due to gravity).

The skimmer 50 is configured to accommodate a variation in chiller water level. When the water level is low, the bottom edge of the paddle 52 may be barely submerged in the water in the skimmer box 24. When the water level is high, more of the paddle 52 is submerged. According to some embodiments, the skimmer 50 is configured to accommodate about an 18 inch variation in chiller water level and the paddle 52 extends about 24 inches down from the chain.

One end of the skimmer box 24 includes a ramped surface 58 that slopes upward (perhaps with a fairly shallow slope) to a discharge edge or lip 60. When the paddle 52 approaches the end of its travel through the skimmer box 24, the chain 54 lifts the paddle at approximately the same incline as the ramp 58 so that the bottom edge 56 of the paddle 52 drags along the ramp 58 to pull the float 44 up to the discharge lip 60. The float 44 is sent over the discharge lip 60 to a waste area such as a collection box 62. On the return transit, the chain 54 is positioned or routed high enough that the paddle 52 (which is hanging downward) does not catch float or interfere with other paddles (where used).

Referring to FIG. 4, effluent water 28 is removed from the skimmer box 24 by the saturation pump 32. For example, a stand pipe 66 may be in the skimmer box 24 and in fluid communication with the saturation pump 32. The water 28 is mixed with air 30 in the saturation pump 32 and the air dissolves into the water in the high pressure discharge of the pump. The saturated water 34 is conveyed to the injection nozzle 36. The process described above is then repeated. Other methods of dissolving air into the water such as mixing chambers are familiar to those skilled in the art.

It will be appreciated that the drag style skimmer described above is only one way to remove the float. Other possibilities include but are not limited to screw conveyors or rotary skimmers.

Figure 5:
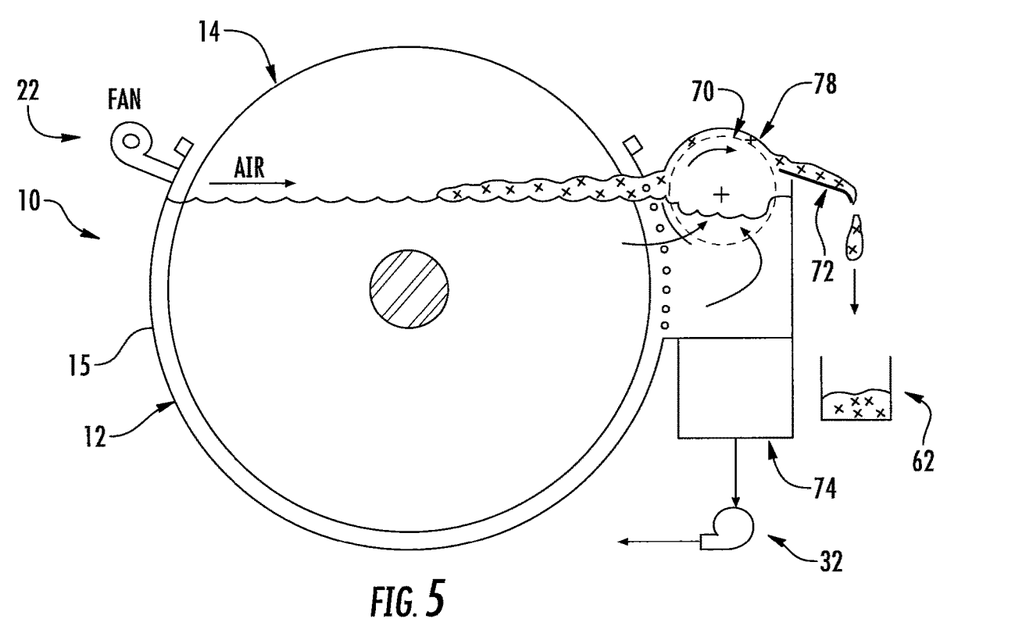
FIG. 5 is a sectional end view of a downstream section of the chiller and the water treatment system of FIG. 1 including a rotary screen in a suction box according to some embodiments.
Figure 6:
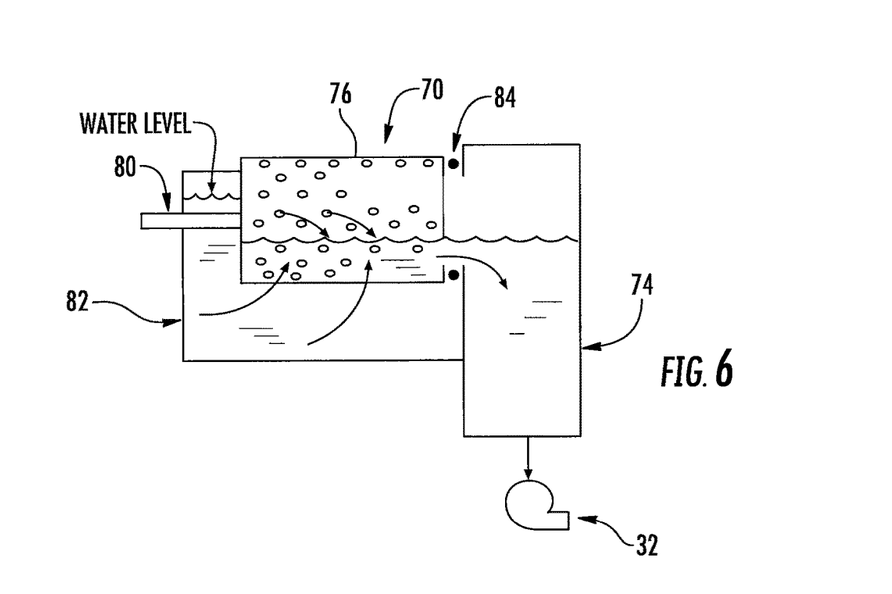
FIG. 6 is a sectional view through the rotary screen of FIG. 5.
Figure 7:
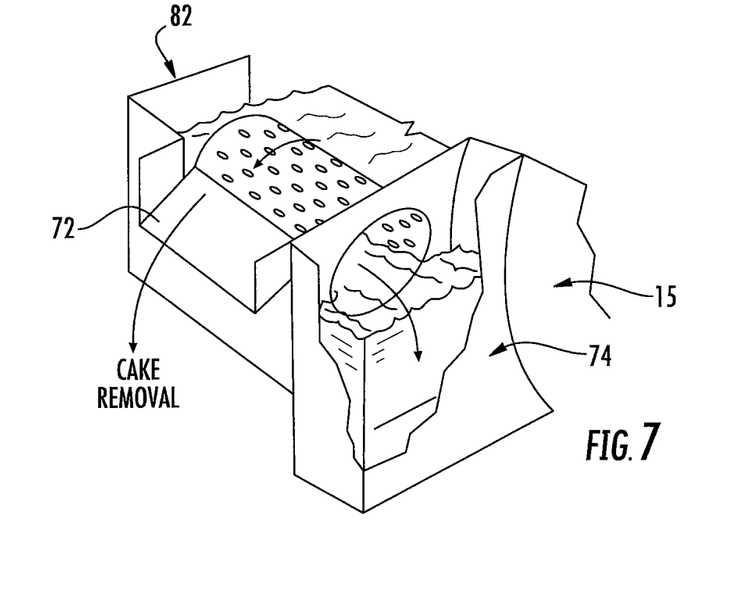
FIG. 7 is a perspective view of the rotary screen of FIG. 5.

An alternative arrangement for removing float as well as suspended solids is illustrated in FIGS. 5-7. A rotary screen 70 (or drum) is mounted in a float holding tank that may be the suction box. A drive shaft 80 is coupled to the rotary screen 70 for rotation thereof. As shown in FIGS. 5 and 6, water from the chiller 10 flows through the porous wall 76 of the rotary screen 70. Solids in the water collect on the outside of the screen and form a cake 78. The cake is scraped off onto a wiper 72 as the screen 70 rotates. According to some embodiments, water or air is sprayed from inside the screen toward the wiper to help remove the cake.

Referring to FIG. 6, the water level in the chiller 10 and an influent box 82 is higher than the level inside the drum and an effluent box 74. This level difference provides the pressure difference to push the water through the screen 70. A pump (which may be the saturation pump 32 or a different pump) removes water from the effluent tank to maintain the reduced water level. In other embodiments, the pump may be a circulation pump supplying water to a heat exchanger for the chiller.

A seal 84 may be positioned between the rotary screen 70 and the effluent box 74.

Figure 8:
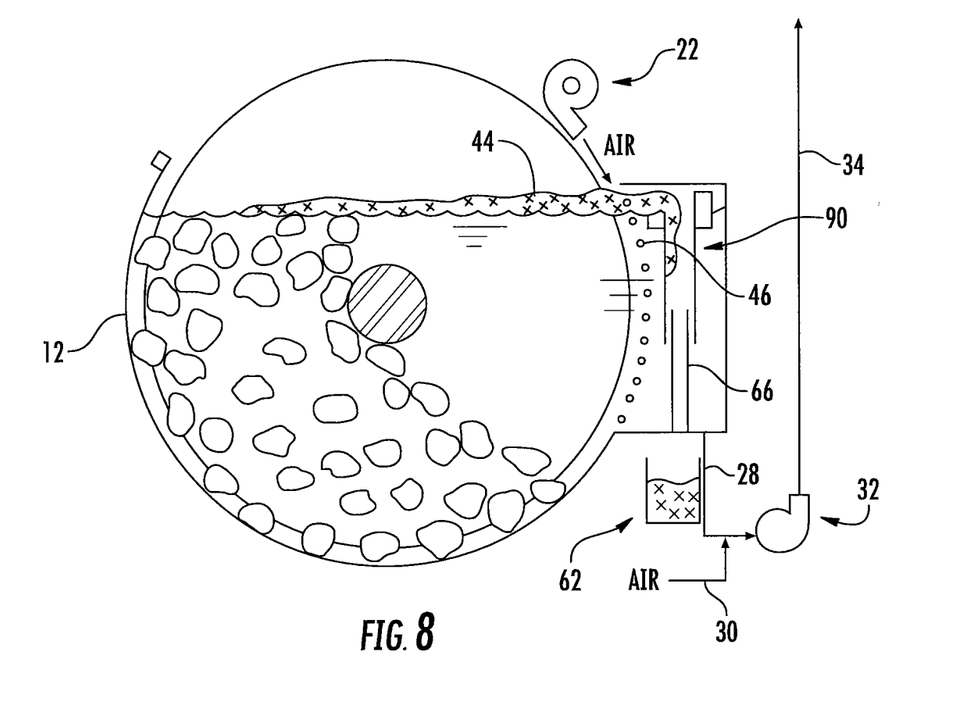
FIG. 8 is a sectional end view of a downstream section of the chiller and the water treatment system of FIG. 1 including a floating weir in a suction box according to some embodiments.
Figure 9:
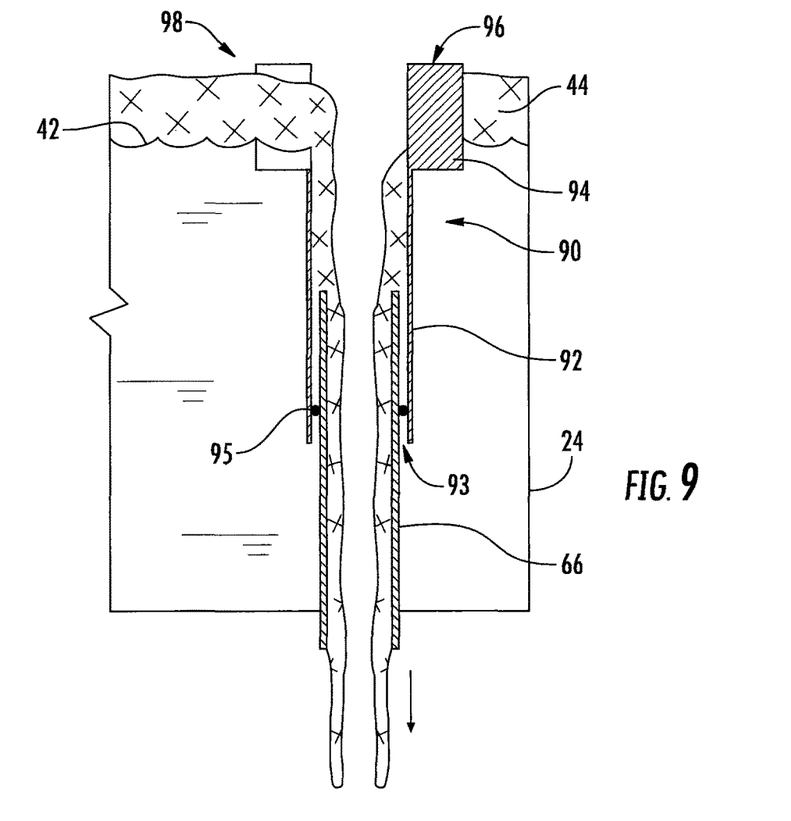
FIG. 9 is a fragmentary sectional view of the floating weir and the suction box of FIG. 8.
Figure 10:
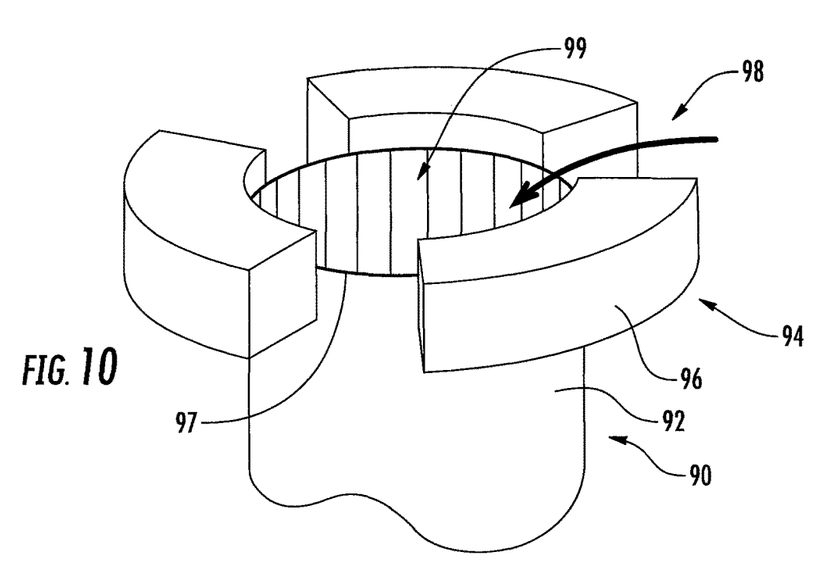
FIG. 10 is a fragmentary perspective view of the floating weir of FIG. 8.

A further alternative arrangement for removing float as well as suspended solids is illustrated in FIGS. 8-10. A floating weir 90 is positioned in the skimmer box 24 (which may be combined with the suction box as described above). The weir 90 includes a float collar 94 and a tubular portion 92 extending downwardly from the collar 94. The tubular portion 92 is received around a drain chute (e.g., the stand pipe 66) in the skimmer box 24. A sliding seal 95 may be provided between the tubular portion 92 and the stand pipe 66 (e.g., at or adjacent a lower opening 93 of the tubular portion 92). As used herein, the term "tubular portion" is meant to encompass an elongated hollow member having a variety of cross-sectional shapes (e.g., circular, elliptical, polygonal). In other embodiments, the tubular portion 92 may be received inside the drain chute.

The weir 90 is configured such that the float collar 94 floats at the surface of water in the skimmer box 24. The floating weir 90 travels up and down as the water level fluctuates. Float 44 in the skimmer box 24 flows over a weir edge 97 at or adjacent an upper opening 99 of the tubular portion 92 and down the tubular portion 92 of the weir 90 and drains in the direction indicated by the arrow in FIG. 9. The drained float may be collected in a collection box 62 (FIG. 8).

More specifically, referring to FIG. 10, the float collar 94 may include a plurality of spaced apart segments 96 with a gap 98 defined between adjacent ones of the segments 96. The gaps 98 provide a flow path for the float 44 to flow therethrough and into the tubular portion 92 of the weir 90.

Figure 11:
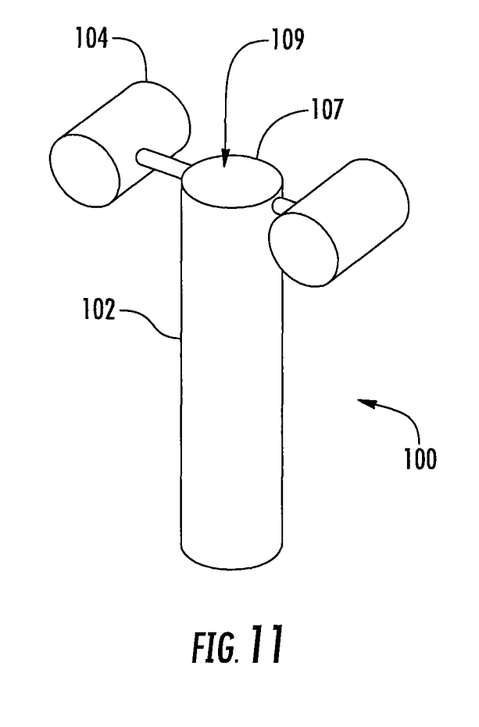
FIG. 11 is a perspective view of another embodiment of a floating weir that can be used with the chiller and the water treatment system of FIG. 1.
Figure 12:
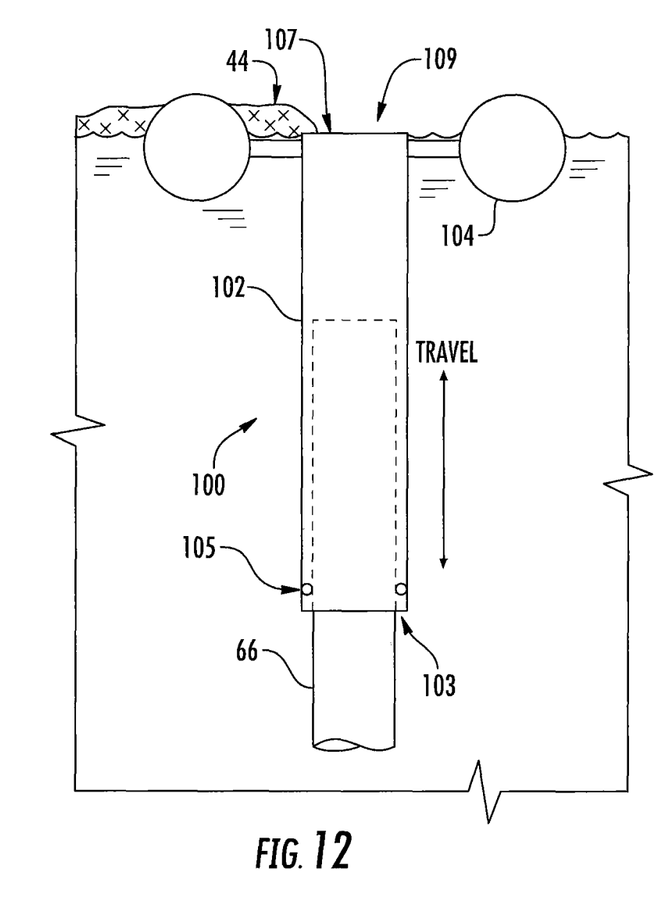
FIG. 12 is a side view of the floating weir of FIG. 11.

Another embodiment of a floating weir 100 of the tubular form is illustrated in FIGS. 11 and 12. The floating weir 100 may be used in place of the floating weir 90 illustrated in FIGS. 8-10 (e.g., the floating weir 100 may be in the skimmer box 24 of FIG. 9). The floating weir 100 includes a tubular portion 102 and one or more floatation chambers or members 104. According to some embodiments, a plurality of floatation members 104 are employed. For example, as illustrated, the floating weir 100 includes two floatation members 104, although it will be appreciated that more than two flotation members may be used. According to some embodiments, the floating weir 100 may include a single floatation member 104 (e.g., the floatation member 104 may be shaped as a polygon or a ring and surround an upper portion of the tubular portion 102).

Like with the weir 90, float 44 flows over a weir edge 107 at or adjacent an upper opening 109 defined by the tubular portion 102 and down the tubular portion 102 of the weir 100 and drains through the drain chute (e.g., the stand pipe 66). A sliding seal 105 may be between the tubular portion 102 and the stand pipe 66 (e.g., at or adjacent a lower opening 103 of the tubular portion 102, or at or adjacent an upper end of the stand pipe 66).

Figure 13:
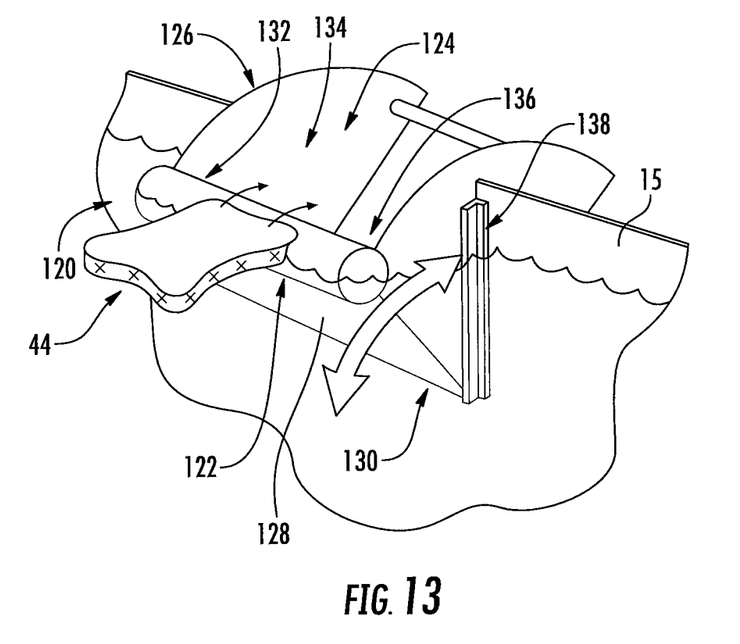
FIG. 13 is a fragmentary perspective view illustrating a floating weir having a linear configuration that can be used with the chiller and the water treatment system of FIG. 1.

A floating weir 120 having a linear configuration is illustrated in FIG. 13. The weir 120 includes at least one floatation chamber or member 122 that is configured to float on the water surface. The weir 120 includes a chute 124 that is defined by chute sidewalls 126 and a chute front wall 128. As illustrated, the chute 124 is hingedly or pivotally attached to the tank sidewall 15 by, for example, hinge 130. Those skilled in the art will appreciate that the floatation member 122 may have a geometric form that maintains the weir edge 132 in consistent proximity to a surface of water in the tank as the weir 120 pivots in response to higher or lower water level. Alternatively, the weir 120 may be in a separate vessel such as the float holding tank 24 illustrated in FIG. 4. With such an arrangement, the chute 124 may be hingedly or pivotally attached to a sidewall 25 of the tank 24.

The flotation member 122 floats at the surface of the water and travels as indicated by the arrow as the water level fluctuates. The weir 120 includes a weir edge 132 at an upper opening 134 of the weir 120. The weir edge 132 is configured to allow float 44 on a surface of the water to pass over the weir edge 132 into the upper opening 134 and through the weir 120 to a lower opening 136 thereof. The float therefore exits the tank and can be collected as described above (e.g., using the collection box 62 illustrated in FIG. 5).

A seal 138 may be provided between the chute 124 and the tank sidewall 15. The seal 138 may be between the chute sidewalls 126 and the tank sidewall 15. If a separate float holding tank is used as described above, the seal 138 may be between the chute 124 and the tank sidewall 25 (FIG. 4).

In some embodiments, the fan 22 may be positioned on the same side of the chiller as the float holding tank 24. For example, referring to FIG. 8, the fan 22 may be positioned on the same side of the chiller as the float holding tank 24 in order to be closer to the weir 90 so that a stream of air directed toward the weir will have sufficient momentum to assist pushing the float over the weir edge 97 (FIG. 10). This same configuration could be used with the weirs 100 and 120 (FIGS. 11-13). The fan 22 may be coupled to the tank 12 or the tank sidewall 15 using any suitable connection feature (e.g., a hook). Alternatively, the fan 22 may be suspended from a separate structure to be positioned over the tank 12.

The examples described herein illustrate water treatment systems integrated with an auger style chiller. It will be appreciated that the water treatment systems can also be applied to rocker style or drag style chillers or other immersion type chillers in a similar fashion.

Embodiments of the present invention treat water in poultry chillers to reduce the concentration of fats, oil and grease in order to improve the efficacy of anti-microbial treatment to the water and increase the length of time such water is suitable for use in chilling poultry products. The water treatment systems described herein allow the water to be (continuously) treated and kept in use for days. This is in contrast to the "cold hold" process sometimes used in the industry in which the water is held in the tank for days without proper treatment. It is likely that a regulatory agency such as the USDA will put rules in place requiring treatment of water held for extended processing intervals.

Embodiments of the present invention also reduce the capital cost of the water treatment system by integrating the active components of the treatment system into existing features of the poultry chiller. In this regard, some components of known treatment systems may be eliminated. For example, as described above, certain features of the present invention are similar to those of DAF systems. However, embodiments of the present invention eliminate components of the DAF system such as the separation tank. Instead, the separation takes place in the chiller itself.

Further, the problem of moving contaminants that float on the surface of the water in the chiller to a location where they can be removed is solved by blowing air across the surface of the chiller water to move contaminants in the desired direction. Blowing air as described herein advantageously does not interfere with the movement any structure (e.g., auger or rocker) in the tank. Further, blowing air across the surface of the water has minimal impact on the flow of product and water in the tank.

According to some embodiments, the injection nozzle may be omitted from the water treatment systems and methods described herein. The saturation pump may be replaced with a standard pump for directing the water to a heat exchanger such as a re-chiller. Therefore, water treatment systems and methods according to some embodiments include the fan and a float removal mechanism such as the paddle, rotary screen, or weir described above. Such an arrangement may be sufficient to satisfy water cleaning or treatment regulations in certain jurisdictions.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

What is claimed is:

1. A water treatment system for a poultry chiller, the system comprising:
 a chiller tank with an auger, dasher, or rocker disposed in the chiller tank;

a float holding tank at the chiller tank;
a fan at the chiller tank that is configured to blow float formed on a surface of water in the chiller tank into the float holding tank; and
a float removal mechanism at the float holding tank that is configured to remove the float from the float holding tank,
wherein the float holding tank is integrated with the chiller tank and outside a path of movement of the auger, dasher, or rocker,
wherein the float removal mechanism comprises a floating weir in the float holding tank and a stationary vertical drain chute in communication with the outside of the float holding tank,
wherein the floating weir comprises a float collar and a tubular portion extending downwardly from the float collar,
wherein the tubular portion is received inside or outside the drain chute and is configured to move up and down relative to the drain chute in response to fluctuation of a water level in the float holding tank, and
wherein the floating weir comprises an upper opening with a weir edge configured to allow float on a surface of the water to pass over the weir edge into the upper opening and a lower opening configured to allow float passing through the floating weir to exit through the drain chute by gravity flow, the floating weir further configured to float in the water of the float holding tank with the weir edge proximate the water level in the float holding tank.

2. The system of claim 1 wherein the fan is positioned on a first side of the chiller tank and the float holding tank is positioned on a second, opposite side of the chiller tank.

3. The system of claim 2 wherein the fan is adjacent and/or coupled to an upper portion of a sidewall of the chiller tank.

4. The system of claim 1 wherein the lower opening of the floating weir is configured to provide a sliding seal against the drain chute.

5. The system of claim 1 wherein the floating weir comprises a plurality of spaced apart flotation segments with a gap defined between adjacent ones of the segments, the gaps providing a flow path for float to flow therethough and into the upper opening of the floating weir.

6. The system of claim 1 wherein the float holding tank and the fan are at a downstream section of the chiller tank.

7. The system of claim 6 wherein poultry progresses from an upstream section of the chiller tank to the downstream section of the chiller tank during operation of the poultry chiller.

* * * * *